US006175168B1

(12) United States Patent

Budd et al.

(10) Patent No.: US 6,175,168 B1

(45) Date of Patent: Jan. 16, 2001

(54) OVERMOLDED STATOR FOR FUEL METERING SOLENOID AND METHOD OF MANUFACTURING SAME

(75) Inventors: Walter Budd, Troy; Steve R. Hojnacki, Clarkston, both of MI (US)

(73) Assignee: Pontiac Coil, Inc., Clarkston, MI (US)

( * ) Notice: Under 35 U.S.C. 154(b), the term of this patent shall be extended for 0 days.

(21) Appl. No.: 09/293,894

(22) Filed: Apr. 19, 1999

(51) Int. Cl.[7] .......... H02K 1/22

(52) U.S. Cl. .......... 310/12; 310/30; 310/35; 310/34; 310/12; 310/14; 310/15; 310/51; 310/43; 310/45

(58) Field of Search .......... 310/30, 35, 34, 310/12, 14, 15, 51, 235, 43, 45; 251/129.19, 129.02, 77, 285, 137; 29/596

(56) References Cited

U.S. PATENT DOCUMENTS

| | | | | |
|---|---|---|---|---|
| 4,010,390 | * | 3/1977 | Stampfli | 310/30 |
| 4,259,653 | * | 3/1981 | McGonigal | 310/15 |
| 4,295,066 | * | 10/1981 | Lloyd et al. | 310/30 |
| 4,342,443 | * | 8/1982 | Wakeman | 251/137 |
| 4,358,691 | * | 11/1982 | Nayler | 310/12 |
| 4,368,446 | * | 1/1983 | Araki et al. | 310/14 |
| 4,643,653 | * | 2/1987 | Masaka et al. | 310/30 |
| 4,661,048 | * | 4/1987 | Masaka et al. | 310/30 |
| 4,725,208 | * | 2/1988 | Brown | 310/30 |
| 4,840,163 | * | 6/1989 | Alsobrooks et al. | 251/129.01 |
| 4,845,392 | * | 7/1989 | Mumbower | 310/14 |
| 5,000,421 | * | 3/1991 | Hendrixon et al. | 251/129.08 |
| 5,051,631 | * | 9/1991 | Anderson | 310/14 |
| 5,075,584 | * | 12/1991 | Hendrixon et al. | 310/14 |

* cited by examiner

*Primary Examiner*—Thomas M. Dougherty
*Assistant Examiner*—Saeed Ghahramani
(74) *Attorney, Agent, or Firm*—Young & Basile, P.C.

(57) ABSTRACT

An encapsulated stator for use in solenoid-actuated liquid metering device has a bobbin assembly and a plunger guide which are substantially surrounded by a plastic overmold to hold the assembly together and provide a protective housing. Upper and lower ends of the plunger guide are not covered by the overmold, but rather are left exposed so that additional manufacturing and assembly steps may be performed upon the stator. The plunger guide is formed integrally with a support plate and two threaded body for receiving bolts to secure the stator in its operating position. A plastic cap with an integrally molded electrical connector housing for mating engagement with an electrical power supply is secured to the bobbin assembly and retains the core and plunger guide in proper positions relative to the bobbin prior to the assembly being encased in the overmold. A method of manufacturing the encapsulated stator is also disclosed.

17 Claims, 5 Drawing Sheets

OVERMOLDED STATOR FOR FUEL METERING SOLENOID AND METHOD OF MANUFACTURING SAME

FIELD OF THE INVENTION

The present relates to solenoid-type fuel metering devices such as those used on diesel and other direct fuel injection internal combustion engines, and more particularly to an improved stator for use in such a solenoid.

BACKGROUND OF THE INVENTION

In modern direct fuel injection engines, such as diesels, it is known to use one or more solenoid actuated devices to control the volume and timing of the fuel supplied to the fuel injectors associated with each combustion chamber. Such solenoid fuel metering devices are preferably electronically controlled and allow the extremely precise metering of fuel necessary to achieve optimum engine performance and low emissions. Fuel metering solenoids must be extremely rugged in order to function properly in the engine environment over a long service life, and they must be able to operate at relatively high fuel pressures.

In order to ensure the factory-set performance characteristics of the engine are not altered by a mechanic or operator after the engine is sold, it is desirable to construct the fuel metering devices to prevent or discourage any tampering therewith.

A prior art fuel metering solenoid stator, as seen in FIG. 1, comprises two large metal components: a casing 100 which houses a solenoid bobbin assembly, and a tubular metal plunger guide 102 with an integral top plate 104. The stator is assembled by inserting the bobbin assembly into a cavity formed in the lower surface of the casing 100, placing mold cores in alignment with three apertures 106,108 in the top of the casing, and pouring or injecting a liquid plastic into the cavity to surround the bobbin assembly and mold cores. The mold cores are removed to leave three holes 110,112 passing completely through the casing 100, and the plunger guide 102 is inserted downwardly through the large, center hole 110 so that it passes through the center of the bobbin assembly. Bolts are inserted upwardly through the two smaller holes 112 passing adjacent the outside of the bobbin and engage threaded holes 114 in the top plate 104 to secure the top plate to the casing and the entire assembly to an engine (not shown). An electrical connector 116 for supplying current to the bobbin wire exits the side of the casing.

A metering plunger (not shown) is inserted upwardly into the bore 118 of the plunger guide 102 from below and a spring (not shown) is disposed in the upper end of the guide 102 to bias the plunger downwardly. When the solenoid stator is energized, the magnetic field generated thereby draws the plunger upward to alternatively open and close a metering orifice below the stator assembly.

This prior art stator assembly requires a significant amount of precision machining and assembly, and therefore is relatively expensive to produce.

SUMMARY OF THE INVENTION

It is an objective of this invention to provide a stator for a liquid metering solenoid that is less costly to produce than prior art stators. It is a further objective of this invention to provide a stator assembly that is substantially encapsulated within a plastic material and so is rugged and tamper resistant.

According to the invention, an encapsulated stator comprises a bobbin assembly and a plunger guide which are substantially surrounded by a plastic overmold to hold the assembly together and provide a protective housing. Upper and lower ends of the plunger guide are not covered by the overmold, but rather are left exposed so that additional manufacturing and assembly steps may be performed on the stator. An electrical conductor is connected to the coil and passes through the overmold so that electrical power may be supplied to the coil.

According to another feature of this invention, the encapsulated stator further includes at least one threaded body having a threaded hole for receiving a fastener such as a bolt. In the preferred embodiment, two threaded bodies are utilized and are positioned on opposite sides of the bobbin assembly with the threaded holes parallel to a longitudinal axis of the plunger guide. The threaded bodies are substantially surrounded by the overmold with the holes exposed at the lower surface of the stator and are used to fasten the stator in its operating position.

According to a further feature of the invention, the plunger guide and the threaded body are connected with one another by a support plate which extends substantially normal to the longitudinal axis of the plunger guide and is disposed above the bobbin assembly. The support plate serves to positively position the threaded bodies relative to the plunger guide so as to ensure dimensional accuracy of the finished part. In a preferred embodiment of the invention, the support plate, plunger guide and threaded bodies are formed as an integral unit by casting.

According to yet another feature of this invention, a cap is secured to the bobbin assembly adjacent its upper end such that the plunger guide projects through a hole in the cap. The engagement between the cap and the bobbin retains the core and plunger guide in proper positions relative to the bobbin prior to the assembly being encased in the overmold. In a preferred embodiment of the invention, the cap comprises an electrical connector housing for mating engagement with the electrical power supply which powers the solenoid.

The present invention also provides a method of manufacturing an encapsulated stator having the structure described above. In the invention method, a plunger guide is inserted through a center passage of a bobbin assembly to form a stator assembly, and a plastic material is molded over and around the stator assembly.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 2:
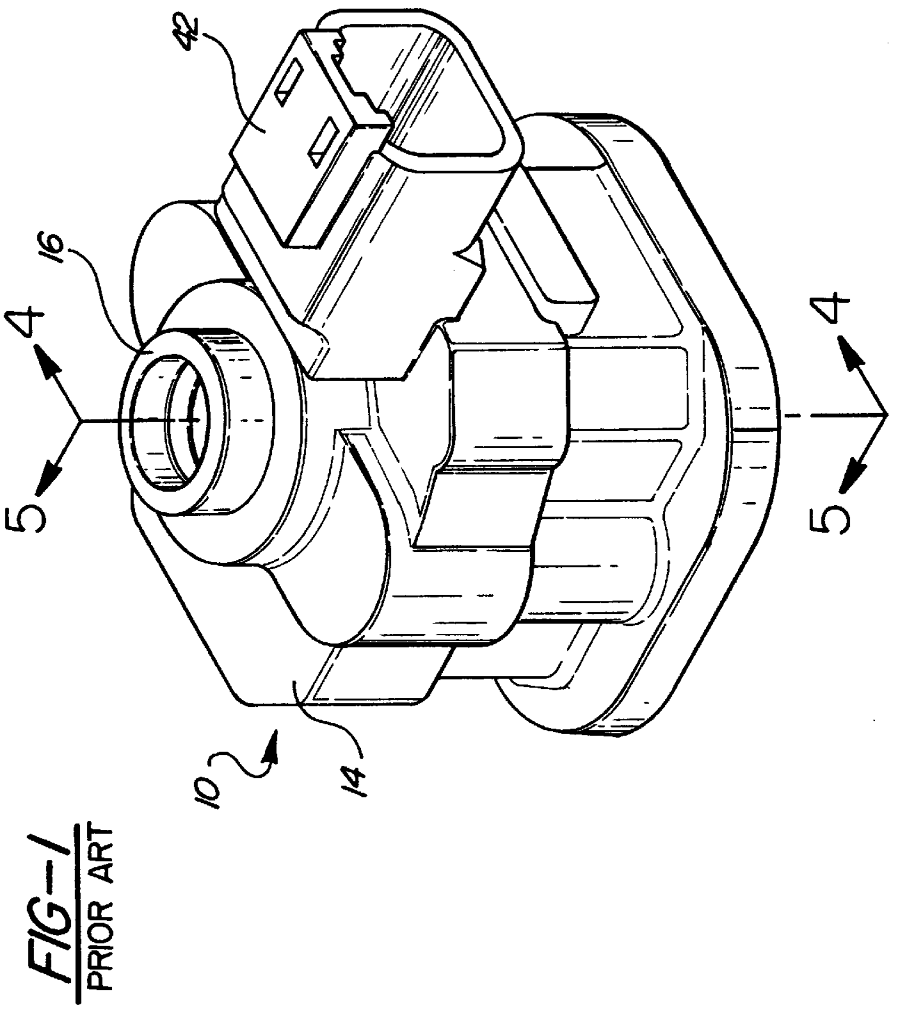
FIG. 2 is a perspective view of an encapsulated stator according to the present invention.
Figure 1:
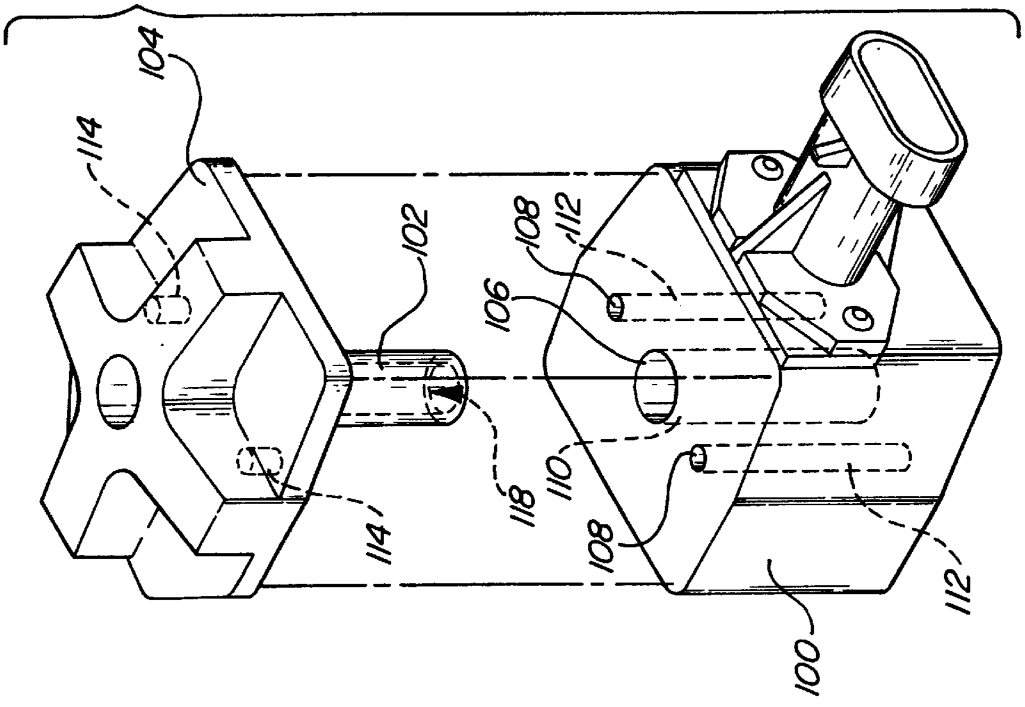
FIG-1 PRIOR ART
FIG. 1 is an exploded perspective view of a prior art stator.
Figure 3:
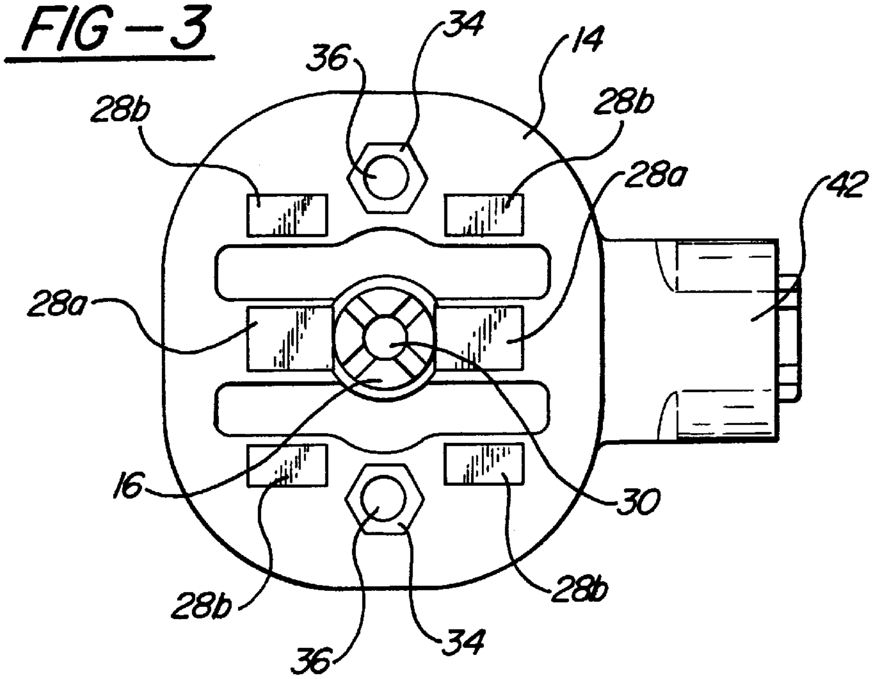
FIG. 3 is a bottom view of the encapsulated stator of FIG. 2.

Referring to FIGS. 2–7, an encapsulated liquid metering stator 10 according to the present invention comprises a stator assembly 12 encased within and substantially surrounded by a plastic overmold 14. A generally tubular plunger guide 16 extends through the overmold 14 from top to bottom such that its upper and lower ends are exposed at the upper and lower surfaces respectively of the overmold. The exposed lower end of the plunger guide 16 allows a plunger (not shown) to be inserted upwardly into the plunger guide, and the exposed upper end allows a plunger biasing spring (not shown) to be inserted therein. When the invention stator 10 is installed in its operating environment, a lower end of the plunger extends from the plunger guide 16 and alternatively opens and closes a metering orifice depending upon the axial position of the plunger as controlled by energization of the solenoid.

The stator assembly 12 includes a bobbin 18 with a length of electrically conductive wire 20 wrapped therearound to form a coil in the manner well known in the solenoid art. The bobbin 18 is preferably rectangular in overall configuration and is formed from a non-ferrous plastic material. First and second end plates 22 project upwardly from the top surface of the bobbin 18 adjacent opposite ends thereof. Guide ridges 23 extend vertically along the opposite inner surface of the bobbin 18. First and second retaining arms 24 project upwardly from the top surface of the bobbin 18 and have inwardly extending barbs 26 at their distal ends.

First and second cores 28 are formed of a ferrous metal and are inserted downwardly from the top surface of the bobbin 18, one adjacent each of the end plates 22. Each core 28 is generally E-shaped, having a center arm 28*a* passing through the center passageway of the bobbin 18 and two side arms 28*b* passing along opposite outer surfaces of the bobbin. The cores 28 contact and are positioned by the end plates 22 and guide ridges 23 when they are properly positioned within the bobbin 18. As is well known in the solenoid art, the cores 28 are preferably of laminar construction and are manufactured by tack welding or otherwise bonding together a plurality of identical thin sheets of magnetic steel.

The plunger guide 16 is generally cylindrical and has an internal bore 30 extending along its longitudinal axis. The bore 30 is of the proper diameter adjacent its lower end to receive the metering plunger (not shown), and is of larger diameter adjacent its upper end to receive the spring (not shown) which biases the plunger downwardly. After the spring has been inserted into the bore 30 from its upper end, a plug (not shown) is inserted into the bore to retain the spring.

The plunger guide 16 is preferably formed integrally with a support plate 32 which lies in a plane generally normal to the longitudinal axis of the plunger guide. Preferably, first and second threaded bodies 34 are disposed at opposite ends of the support plate 32 and project downwardly parallel with the plunger guide 16. Threaded holes 36 extend upwardly into the threaded bodies 34 from their lower ends. The plunger guide 16, support plate 32, and threaded bodies 34 are preferably formed of a substantially non-ferrous metal and are cast as an integral unit. Alternatively, the threaded bodies may be formed separately from the plunger guide 16 and/or support plate 32. If formed separately, the threaded bodies may be connected with the plunger guide 16/support plate 32 assembly prior to being surrounded by the overmold 14, or may be placed in the mold separately from the other components.

Figure 4:
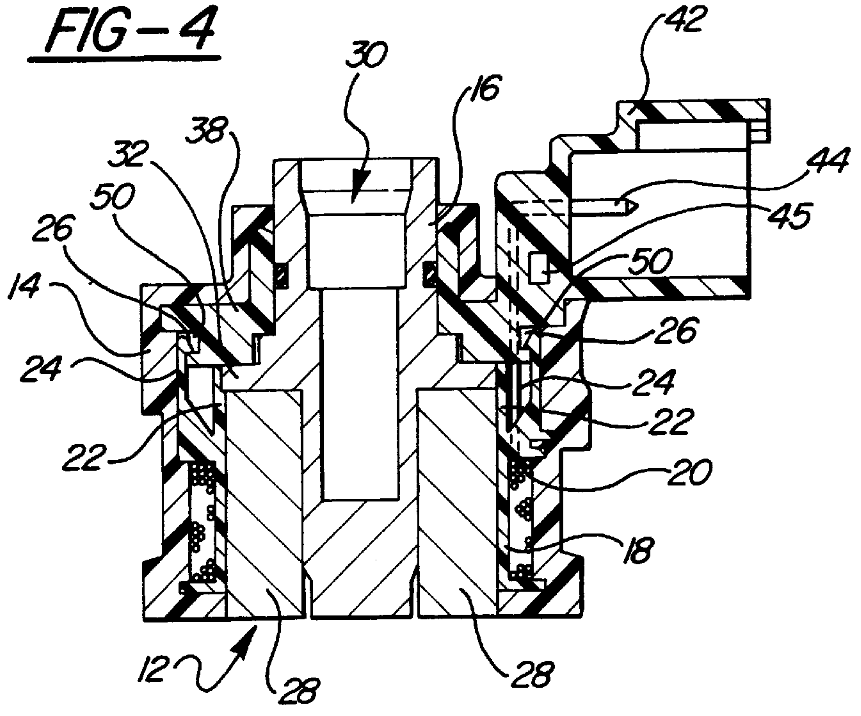
FIG. 4 is a cross section of the stator taken along lines 4—4 in FIG. 2.
Figure 5:
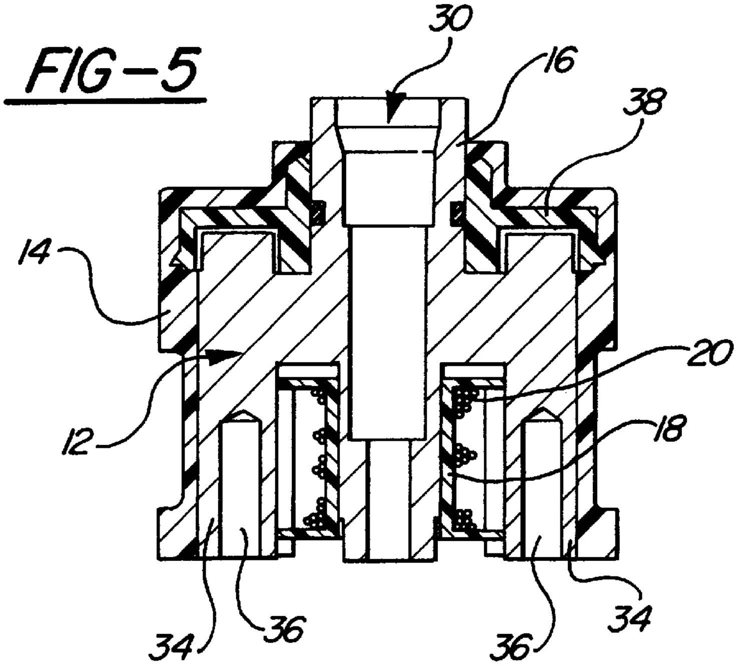
FIG. 5 is a cross section of the stator taken along lines 5—5 in FIG. 2.
Figure 6:
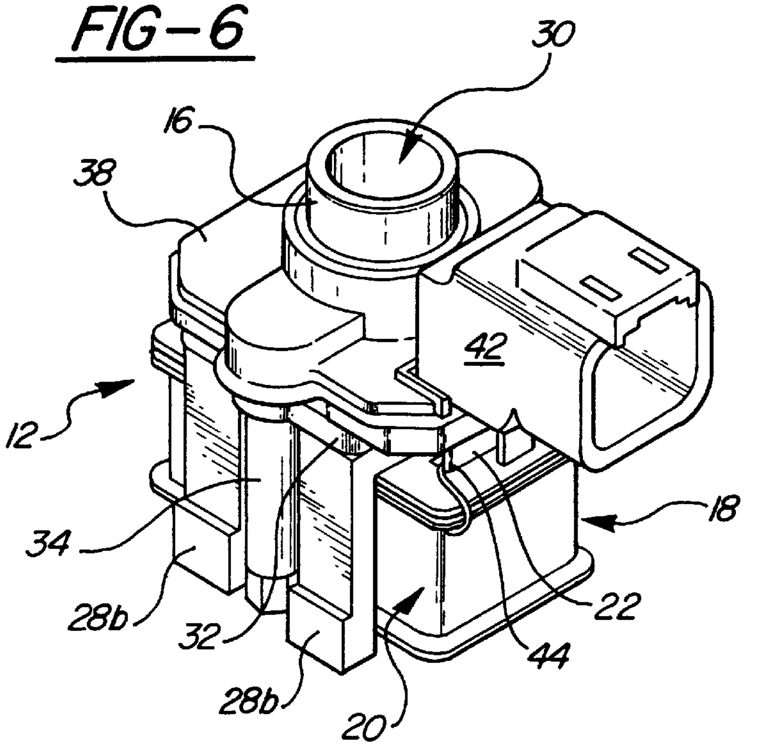
FIG. 6 is an assembly view of a stator assembly according to the present invention prior to being encased in an overmold.
Figure 7:
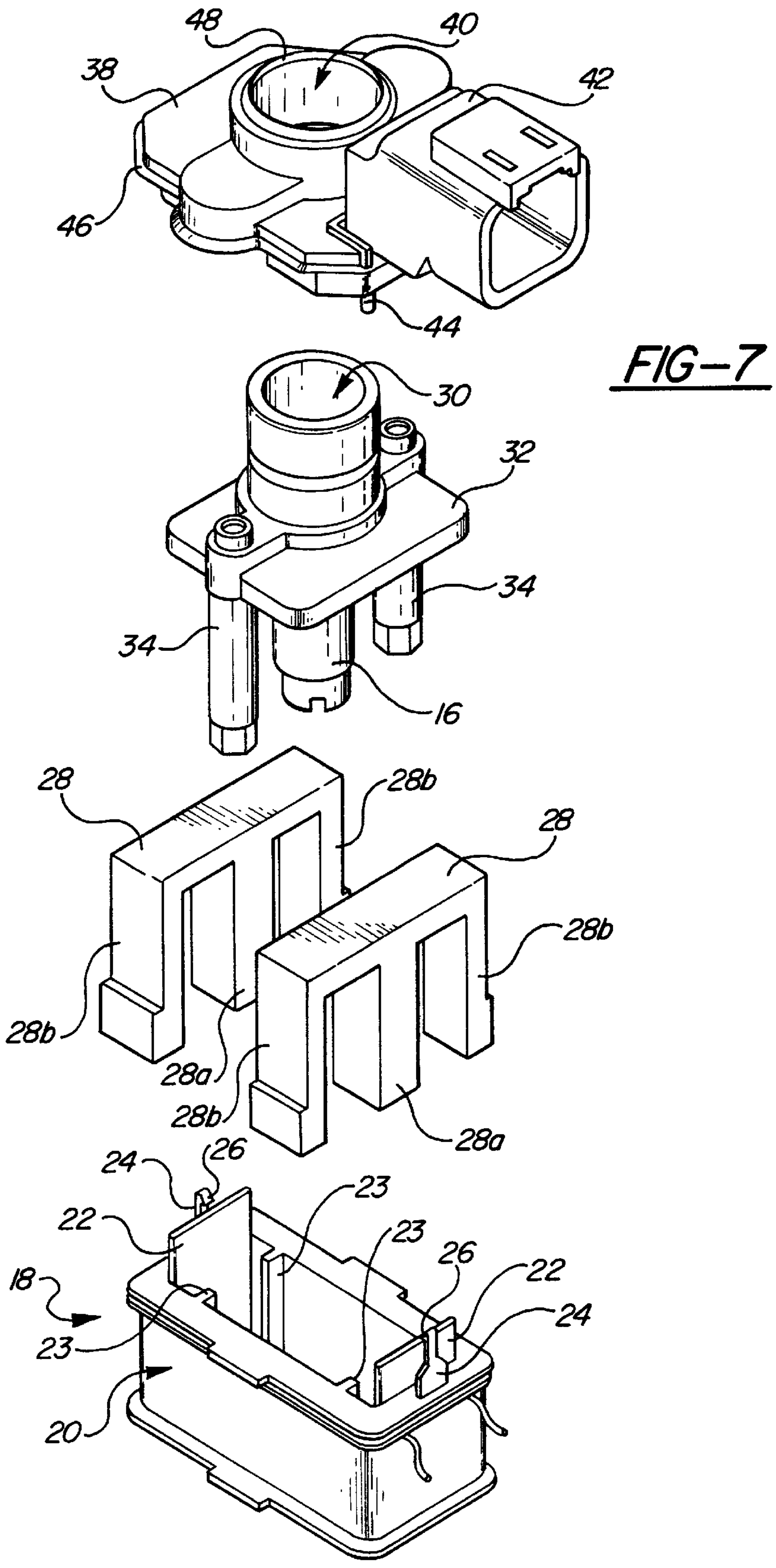
FIG. 7 is an exploded view of the stator assembly shown in FIG. 6.

A connector cap 38 is disposed adjacent a top end of the bobbin 18 assembly and is preferably formed from a thermoplastic material, such as glass-filled nylon, by injection molding. The connector cap 38 has a hole 40 passing vertically through its center and an electrical connector housing 42 is disposed on an upper surface of the cap and extends outwardly therefrom. A pair of electrically conductive wires 44 are molded into the cap so that first ends thereof are disposed adjacent the lower surface of the cap and opposite second ends are disposed within the electrical connector housing 42. One or more electrical circuit components (such as resistors, diodes, transistors, or semiconductors) may be provided to make electrical connection with the coil 20. A circuit component 45 is shown in FIG. 4 molded into the connector housing 42 and connected with wires 44, but such components may also be located elsewhere in or on the encapsulated stator 10 and connect with the circuit formed by the wires 44 and the coil wire 20 at any point. A narrow perimeter ridge 46 extends outwardly around the outer edge of the cap 38, and an annular ridge 48 extends upwardly surrounding the hole 40 in the cap.

After the cores 28 have been properly assembled with the bobbin 18, the plunger guide 16 is inserted downwardly through the center of the bobbin so that it passes between the center arms 28*a* of the two cores 28, and the threaded bodies 34 pass adjacent opposite outer surfaces of the bobbin 18. The support plate 32 contacts the top surfaces of the cores 28 and fits between the end plates 22 of the bobbin 18.

The connector cap 38 is then placed over the top of the plunger guide 16 so that the upper end of the guide projects upwardly through the hole 40 and the lower surface of the cap contacts the upper surface of the support plate 32. The barbs 26 at the distal ends of the retaining arms 24 of the bobbin 18 snap into engagement with notches 50 formed in corresponding positions on the lower surface of the cap 38. The ends of the coil wire 20 are soldered to the first ends of the wires 44 extending downwardly from the cap 38.

When assembled in this fashion, the stator assembly 12 forms a unitary component in which all of the parts are securely retained in their proper positions relative to one another. The unitary stator assembly 12 may be handled and, if necessary, shipped prior to its being inserted into a mold (not shown) for formation of the overmold 14.

The overmold 14 may be formed by a thermoplastic material, in an injection molding process, or by a thermoset plastic. The overmold 14 surrounds the upper surface of the cap 38, leaving the connector housing 42 and the top end of the plunger guide 16 extending upwardly therethrough. The perimeter ridge 46 around the edge of the cap 38 and the annular ridge 48 around the hole 40 provide for a good mechanical bond between the overmold 14 and the cap. The plastic utilized to form the overmold 14 flows into the spaces between the various components of the stator; i.e., into the spaces between the threaded bodies 34 and the bobbin 18, and into the spaces inside the center of the bobbin that are not occupied by the core center arms 28*a* and the plunger guide 16. The overmold 14 preferably leaves the lower ends of the plunger guide 16, the threaded bodies 34, and the cores 28 exposed on the lowermost surface of the encapsulated stator 10.

After the plastic of the overmold 14 has set and the encapsulated stator 10 is removed from its mold, the only machining steps remaining to be performed are those necessary to ensure that the bottom surface of the encapsulated stator is flat and true. The bottom surface is ground flat, including the lower ends of the plunger guide 16, threaded bodies 34, and cores 28.

In a preferred embodiment of the invention manufacturing method, the plunger guide 16 is initially cast or otherwise fabricated such that it is solid adjacent its lower end, the central bore 30 extending downwardly into the guide from the upper end but stopping short of the lower end of the guide. The lower end of the bore 30 is then bored or ground to the correct internal diameter to receive the plunger. This step is preferably performed substantially simultaneously with the grinding of the lower surface of the encapsulated stator. This sequence of manufacturing steps has been found to be an effective way to achieve the very high degree of precision necessary in forming the diameter of the lower, plunger receiving portion of bore 30 and in its perpendicularity of the to the bottom surface of the encapsulated stator.

Figure 8:
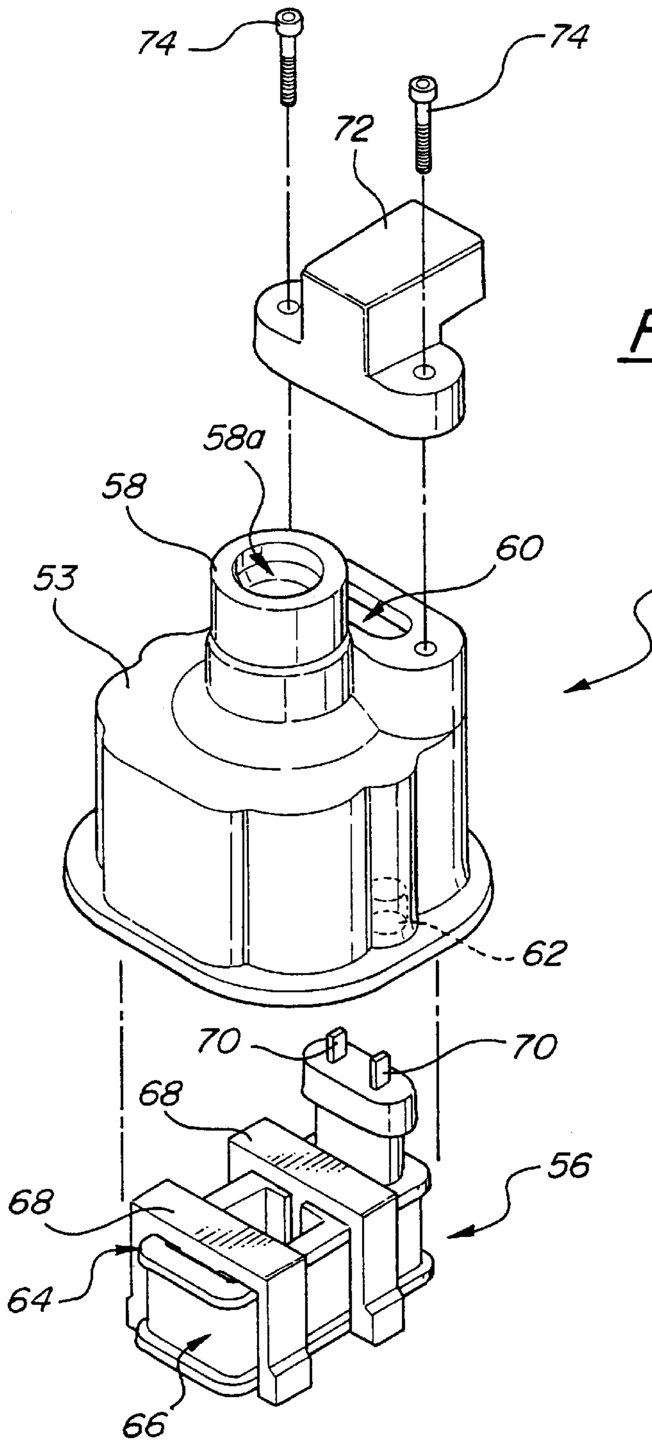
FIG. 8 is an exploded perspective view of an alternative embodiment of a fuel metering solenoid stator.
Figure 9:
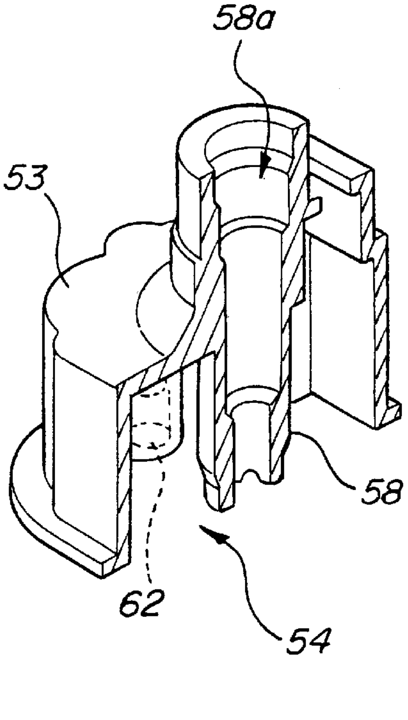
FIG. 9 is a partially cut-away view of the casing and plunger guide of the stator of FIG. 8.

An alternative embodiment of a liquid metering solenoid stator 52 is depicted in FIGS. 8 and 9 and comprises a casing 53 formed of a non-ferrous metal and having a lower cavity 54 for receiving a stator assembly 56 and an integrally formed plunger guide 58 extending downwardly through the cavity 54. The unitary casing 53 and plunger guide 58 are preferably formed by casting and are subsequently machined to form an interior bore 58*a* through the plunger guide 58, an electrical connector aperture 60 in the upper surface of the casing 53, and first and second blind, threaded holes 62 in the lower edge of the casing 53.

The stator assembly 56 comprises a bobbin 64, a coil 66 wrapped on the bobbin, and a pair of cores 68 substantially similar to those used in the encapsulated stator 10 described hereinabove. The ends of the coil wire 66 are soldered or otherwise connected to terminals 70.

During assembly of the stator 52, the stator assembly 56 is inserted upwardly into the lower cavity 54 of the casing 53 such that the plunger guide 58 passes through the center of the bobbin 64 and the terminals 70 project through the connector aperture 60. A connector housing 72 is then fastened to the upper surface of the casing 53 to make electrical connection with the terminals 70 and is secured to the casing 53 by bolts 74. A thermoplastic or thermoset plastic material is then poured or injected into the cavity 54 to surround the stator assembly 56 and secure it in place therein. The lower surface of the resulting solenoid stator is ground flat as in the previously described embodiment, and the lower end of the plunger guide bore 58*a* may be simultaneously bored or ground to the correct diameter.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method of manufacturing an encapsulated stator for a liquid metering solenoid comprising the steps of:

providing a bobbin assembly comprising an electrically conductive coil wound around a bobbin and at least one ferrous core positioned adjacent the bobbin;

providing at least one electrical conductor having a first end connected to the coil and a distal second end;

providing a plunger guide made from a substantially non-ferrous material;

inserting the plunger guide through a center passage of the bobbin to form a stator assembly comprising the bobbin assembly and the plunger guide; and molding a plastic material over and around the stator assembly to substantially surround the stator assembly but leave the upper end of the plunger guide and the second end of the conductor exposed adjacent a top end of the encapsulated stator, and leave lower ends of the plunger guide and core exposed adjacent a bottom surface of the encapsulated stator.

2. The method of claim 1 further comprising the steps of:

providing at least one threaded body having a threaded hole for receiving a fastener; and prior to the molding step, attaching the threaded body to the stator assembly such that the threaded body is adjacent an outer surface of the bobbin assembly, the molding step leaving the threaded hole exposed adjacent the bottom surface of the encapsulated stator.

3. The method of claim 2 wherein the steps of providing the plunger guide assembly and providing the threaded body comprise casting the plunger guide, the threaded body, and a support plate connecting the plunger guide and the threaded body as an integral unit.

4. The method of claim 1 further comprising the steps of:

providing a cap formed of a substantially non-ferrous material, the cap having a hole passing between upper and lower surfaces thereof and the conductor having a first end disposed adjacent the upper surface of the cap and an opposite second end disposed adjacent the lower surface of the cap;

before the molding step, placing the cap over an upper end of the stator assembly such that an upper end of the plunger guide passes through the hole in the cap and the second end of the conductor is disposed adjacent the upper surface of the cap, the molding step substantially surrounding the cap.

5. The method of claim 4 wherein the step of providing the cap comprises injection molding the cap to include an integral electrical connector housing having the second end of the conductor disposed therein, the electrical connector housing left exposed by the overmolding step.

6. The method of claim 4 wherein the step of placing the cap over the stator assembly engages first retaining means on the bobbin and second retaining means on the cap with one another.

7. The method of claim 1 further comprising the steps of:

grinding the bottom surface of the encapsulated stator flat, including the lower end of the plunger guide; and machining a finished hole in the lower end of the plunger guide for receiving a solenoid plunger.

8. The method of claim 1 wherein the molding step comprises placing the stator assembly in a mold and injection molding a heated thermoplastic material into the mold.

9. An encapsulated stator for a liquid metering solenoid comprising:

a bobbin assembly comprising an electrically conductive coil wound around a bobbin and at least one ferrous core positioned adjacent the bobbin;

a plunger guide made from a substantially non-ferrous material and extending through a center passage of the bobbin, the plunger guide having a central bore extending along at least a portion of a longitudinal axis thereof;

at least one electrical conductor having a first end connected to the coil and a distal second end;

a plastic overmold-substantially surrounding the bobbin assembly and the plunger guide, an upper end of the plunger guide and the second end of the conductor exposed adjacent a top end of the overmold and a lower end of the plunger guide exposed adjacent a bottom surface of the overmold.

10. The encapsulated stator according to claim 9 further comprising at least one circuit component in electrical connection with the coil.

11. The encapsulated stator according to claim 9 further comprising:

at least one threaded body having a threaded hole for receiving a threaded fastener, the threaded body positioned adjacent the bobbin assembly such that the threaded hole is parallel with the longitudinal axis of the plunger guide and is exposed adjacent the bottom surface of the overmold.

12. The encapsulated stator according to claim 11 comprising two threaded bodies disposed adjacent opposite sides of the bobbin assembly and the plunger guide.

13. The encapsulated stator according to claim 11 further comprising a support plate extending substantially normal to the longitudinal axis of the plunger guide and disposed above an upper end of the bobbin assembly, the support plate connected to the plunger guide and the threaded body.

14. The encapsulated stator according to claim 13 wherein the plunger guide, the threaded body and the support plate comprise an integrally formed casting.

15. The encapsulated stator according to claim 9 further comprising:

a cap at least partially surrounded by the overmold and secured to the bobbin assembly adjacent an upper end thereof, and the upper end of the plunger guide projecting through a hole formed through the cap.

16. The encapsulated stator according to claim 15 wherein the cap comprises an electrical connector housing having the second end of the conductor disposed therein, the electrical connector housing extending outside of the overmold.

17. The encapsulated stator according to claim 15 further comprising at least one circuit component in electrical connection with the coil, the circuit component disposed within the electrical connector housing.

* * * * *